United States Patent
Irving

(10) Patent No.: US 9,373,863 B2
(45) Date of Patent: Jun. 21, 2016

(54) BARIUM CERATE NANOPARTICLES FOR USE IN SOLID OXIDE FUEL CELLS

(71) Applicant: CERION LLC, Rochester, NY (US)

(72) Inventor: Lyn Marie Irving, Rochester, NY (US)

(73) Assignee: CERION LLC, Rochester, NY (US)

( * ) Notice: Subject to any disclaimer, the term of this patent is extended or adjusted under 35 U.S.C. 154(b) by 269 days.

(21) Appl. No.: 13/957,633

(22) Filed: Aug. 2, 2013

(65) Prior Publication Data

US 2014/0038069 A1 Feb. 6, 2014

Related U.S. Application Data

(60) Provisional application No. 61/679,124, filed on Aug. 3, 2012.

(51) Int. Cl.
| | |
|---|---|
| *C01F 11/00* | (2006.01) |
| *H01M 8/10* | (2016.01) |
| *H01M 8/00* | (2016.01) |
| *C01F 11/04* | (2006.01) |
| *C01F 17/00* | (2006.01) |
| *H01M 8/12* | (2016.01) |

(52) U.S. Cl.
CPC .............. *H01M 8/1016* (2013.01); *C01F 11/04* (2013.01); *C01F 17/0018* (2013.01); *C01F 17/0043* (2013.01); *H01M 8/00* (2013.01); *C01P 2002/30* (2013.01); *C01P 2002/34* (2013.01); *C01P 2002/52* (2013.01); *C01P 2002/72* (2013.01); *C01P 2004/03* (2013.01); *C01P 2004/64* (2013.01); *H01M 2008/1293* (2013.01); *H01M 2300/0074* (2013.01); *Y02E 60/525* (2013.01)

(58) Field of Classification Search
None
See application file for complete search history.

(56) References Cited

U.S. PATENT DOCUMENTS

| 6,294,011 B1 * | 9/2001 | Hedouin et al. ............... 106/439 |
| 2007/0009415 A1 * | 1/2007 | Faber et al. .................... 423/263 |
| 2007/0191220 A1 * | 8/2007 | Bog et al. ...................... 502/304 |
| 2010/0242342 A1 | 9/2010 | Reed et al. |
| 2013/0053251 A1 * | 2/2013 | Igarashi ........................ 505/237 |

OTHER PUBLICATIONS

Meng Bo et al.; "A New Combustion Process for Nanosized $BaCe_{0.95}Y_{0.05}O_{3-\delta}$ Powders" *Journal of Rare Earths*, vol. 22, No. 5, Oct. 2004, p. 658.

* cited by examiner

*Primary Examiner* — Steven Bos
(74) *Attorney, Agent, or Firm* — RatnerPrestia

(57) ABSTRACT

A process for forming alkaline earth metal cerate nanoparticles comprises combining a stable cerium oxide aqueous colloidal dispersion with soluble alkaline earth metal salts while maintaining colloidal stability. The resulting alkaline earth metal salts may be calcined to form alkaline earth metal cerate particles having a perovskite structure.

20 Claims, 3 Drawing Sheets

BARIUM CERATE NANOPARTICLES FOR USE IN SOLID OXIDE FUEL CELLS

CROSS-REFERENCE TO RELATED APPLICATIONS

This application claims the benefit of priority to U.S. Provisional Patent Application Ser. No. 61/679,124, BARIUM CERATE NANOPARTICLES FOR USE IN SOLID OXIDE FUEL CELLS, filed Aug. 3, 2012, the disclosure of which is incorporated herein by reference.

FIELD OF THE INVENTION

The present invention relates generally to synthesis of barium cerate, doped barium cerate, and related compounds, as nanoparticle perovskite powders. Uses, after a subsequent sintering process, include proton conductors in solid oxide fuel cells, and hydrogen separation membranes.

BACKGROUND OF THE INVENTION

Crystalline perovskite materials in the family of $BaCeO_3$ and $SrCeO_3$ and their doped analogues are well recognized candidates for utility as proton conducting electrolytes in solid oxide fuel cell (SOFC) applications. $BaZrO_3$ and $SrZrO_3$ have also received attention for use as SOFC electrolytes. Gadolinium doped or yttrium-doped $BaCeO_3$ and $BaZrO_3$ show particular promise due to their high proton conductivities. Much work has been reported for the preparation of these materials by conventional ceramic processing techniques including mixed oxide methods, chemical co-precipitation, and various solution-based approaches including the sol-gel and Pechini methods and variations thereof. Solid sintered bodies as well as thick films and thin films of these materials are of interest.

The solid state reaction-based mixed oxide method of ceramic synthesis requires repeated and extended mechanical grinding and calcination steps. As is typical of the mixed oxides approach, it is not possible to easily obtain very fine grained, homogeneous, single-phase perovskites of high purity in the $BaCeO_3$, $SrCeO_3$, or $BaZrO_3$ families. Since the principal driving force for sintering of ceramic powders into the high density solids required for fuel cell application is surface energy, preferred ceramic powders have very small particle size that in addition to having high surface energies, also enable relatively high densities in their pre-sintered green state. In this aspect, both the agglomerated particle size and the crystallite size are factors impacting the pre-sintered green density. It is not sufficient that crystallite size be small to drive sintering to the high densities at the lowest sintering temperatures. This is particularly the case when crystallites in the green state are assembled into aggregates having strong chemical bonding between crystallites. Very small particle size for Y-doped $BaCeO_3$ has been reported in "A New Combustion Process for Nanosized $BaCe_{0.95}Y_{0.05}O_{3-\delta}$ Powders" JOURNAL OF RARE EARTHS, Vol. 22, No. 5, October 2004, p. 658, by Meng Bo et al. Although the authors disclose single phase material having a size of the order of 40 nanometers (nm), elimination of agglomerates formed by their process is only achieved after mechanical milling. Most references for the preparation of $BaCeO_3$ materials report particle sizes of 100 nm up to micrometer-sized particles.

A significant disadvantage of the combustion process referenced above and similar approaches is that the organic materials required for the chelation or complexing of metal ions must be burned away as part of the process of forming the desired ceramic powders. The undesirable features include the consumption of costly materials and the production of waste gasses including carbon dioxide.

What is needed is a process for preparing doped or undoped $BaCeO_3$, $SrCeO_3$, $BaZrO_3$, and $SrZrO_3$ that gives rise to single-phase perovskite powders having crystallite size below 40 nm and with limited aggregation of crystallites, using relatively low process temperatures, and wherein the process does not produce significant waste.

SUMMARY OF THE INVENTION

It has been discovered that stable cerium oxide aqueous colloidal dispersions having particle sizes of a few nanometers, when combined with soluble alkaline earth metal salts while maintaining colloidal stability, are useful for the production of sub-40 nm powders of single phase alkaline earth metal cerate and cerate perovskite materials having the formula $MCeO_3$, where M may be barium or strontium.

On aspect of the invention relates to a process of forming a powder comprising:
(a) combining an aqueous dispersion of cerium-containing nanoparticles with a substantially equimolar amount of a soluble alkaline earth metal material relative to cerium, thereby forming an aqueous reaction mixture; and
(b) heating said reaction mixture to dryness, thereby forming a powder comprising cerium-containing nanoparticles and alkaline earth metal-containing particles.

It is an object of the invention to provide a process for producing $MCeO_3$ by a scalable low cost process wherein the process comprises:
(a) forming an aqueous stabilized cerium oxide colloidal dispersion;
(b) combining the stabilized cerium oxide colloidal dispersion with a substantially equimolar amount of a soluble alkaline earth metal salt;
(c) heating the combined colloidal dispersion/solution to eliminate volatile components and thereby form a solid; and
(d) calcining the solid at a higher temperature to achieve the $MCeO_3$ perovskite phase.

It is yet another object of the invention to provide a process for producing doped versions of $MCeO_3$ ceramic powders by a scalable low cost process wherein the process further comprises the addition of soluble salts of the desired one or more dopants together in solution with the alkaline earth metal element and the colloidal cerium oxide.

It is an object of the invention that one or more dopants are optionally incorporated into the cerium oxide nanoparticles of the stable aqueous cerium colloidal dispersion.

It is a further object of the invention to provide substantially single phase perovskite powders of doped or undoped $MCeO_3$ having particle sizes in the range of 20 nm to 40 nm, the powders having advantageous morphology for sintering.

It is another object of the invention to provide a process for producing $MCe_{1-x}Zr_xO_3$ by a scalable low cost process wherein the process comprises:
(a) forming an aqueous stabilized cerium oxide-zirconium oxide colloidal dispersion;
(b) combining the stabilized cerium oxide-zirconium oxide colloidal dispersion with a substantially equimolar amount of a soluble alkaline earth metal salt relative to the total amount of cerium and zirconium;
(c) heating the combined colloidal dispersion/solution to eliminate volatile components and form a solid; and,
(d) calcining the solid at a higher temperature to achieve the perovskite phase.

It is a further object of the invention to provide substantially single phase perovskite powders of doped or undoped $MCe_{(1-x)}Zr_{(x)}O_3$ having particle sizes in the range of 20 nm to 40 nm the powders having advantageous morphology for sintering.

DETAILED DESCRIPTION OF THE INVENTION

Figure 1:
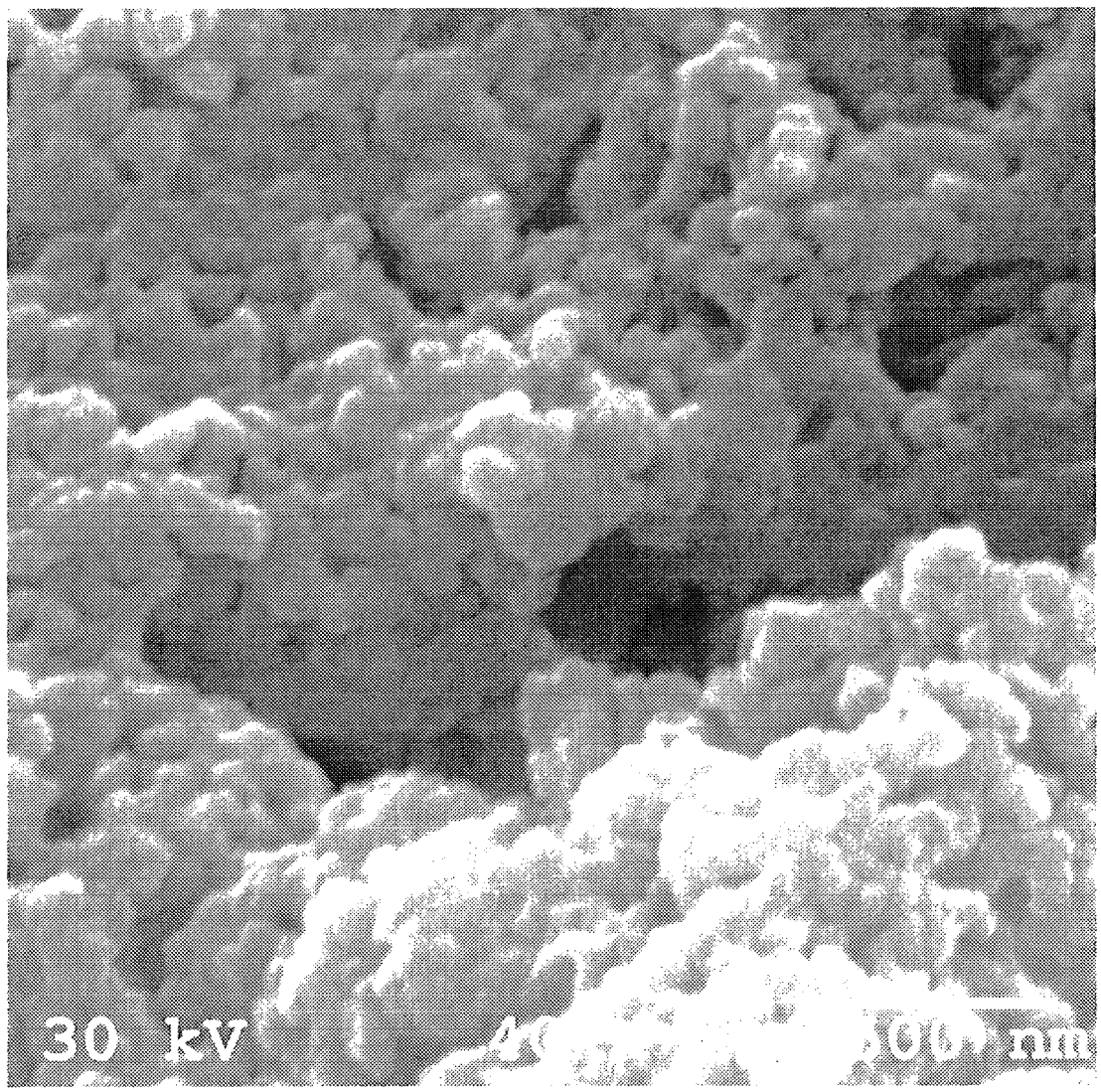
FIG. 1 is a Scanning Electron Micrograph of $BaCeO_3$ particles made according to the inventive process of Example 2.

Successful SOFC devices require solid electrolytes having low porosity and no open porosity, as mass transport within the electrolyte is to be only through ionic conduction. Achieving high densities in sintered ceramics generally requires high quality green materials formed to high green densities, and subsequent sintering at high enough temperature that solid state diffusion processes are operative. In the case of barium cerate, for example, the problem of achieving high sintered density is further encumbered by incongruent melting behavior at 1480 C. Again high quality, high surface area calcined powders as starting materials for sintering enable the formation of dense ceramic bodies of the SOFC electrolyte materials. Also, because $BaCeO_3$ and $SrCeO_3$ can decompose at SOFC operating temperatures when exposed to $CO_2$, thereby forming carbonates, it is desirable to achieve high density in the sintered bodies to help mitigate the carbonate formation.

Thus it is of interest to enable the straightforward sintering of $MCeO_3$ SOFC electrolyte structures. The inventors have discovered that the use of a stabilized aqueous ceria sol as a reactant with soluble alkaline earth metal salts enables the formation of substantially single phase perovskite powders having average crystallite size below 40 nm. The term stabilized aqueous sol used herein refers to an aqueous nanoparticle colloidal dispersion that is stable against flocculation. These powders function as ideal starting materials for sintering of the SOFC electrolyte materials. Advantageously, the stabilized aqueous sol process does not employ precipitation, and is environmentally favored, there being low content of organics to be burned away, and relatively low emission of $CO_2$.

Processes for forming stabilized aqueous sols of cerium oxide, which yield substantially monodisperse nanoparticles of cerium oxide having about 2.5 nm size (as determined by X-ray diffraction peak-width analysis or transmission electron microscopy) have been described, for example, in commonly assigned U.S. Patent Application Publication 2010/0242342 A1, CERIUM-CONTAINING NANOPARTICLES, filed May 13, 2010, by K. J. Reed et al., which is incorporated herein by reference. The nanoparticles may have a diameter ranging from about 1 nm to about 50 nm, such as, for example, from about 1.5 to 8 nm, from 2 to 4 nm, or from 2 to 3 nm.

Although nominally described as "cerium oxide" or "cerium dioxide", it is understood by one skilled in the chemical arts, that the actual oxidic anions present may comprise oxide anions or hydroxide anions, or mixtures thereof, such as hydrated oxide phases (e.g. oxyhydroxide). In addition, compositions of matter comprised of solid solutions of multivalent cations are often termed non-stoichiometric solids. Thus, for oxide phases comprised of metal cations of multiple oxidation states, it is understood that the total amount of oxidic anions present will be determined by the specific amounts of the various oxidation states of the metal cations present (e.g. $Ce^{3+}$ and $Ce^{4+}$), such that charge neutrality is maintained. For non-stoichiometric phases nominally described as metal dioxides, this is embodied in the chemical formula $MO_{2-\delta}$, wherein the value of $\delta$ (delta) may vary. For cerium oxides, $CeO_{2-\delta}$, the value of $\delta$ (delta) typically ranges from about 0.0 to about 0.5, the former denoting cerium (IV) oxide, $CeO_2$, the latter denoting cerium (III) oxide, $CeO_{1.5}$ (alternatively denoted $Ce_2O_3$).

Herein the terms ceria, cerium oxide and cerium dioxide are used interchangeably.

In one embodiment of the invention, a process to form an aqueous cerium-containing nanoparticle sol comprises forming an aqueous cerium-containing nanoparticle dispersion directly in an aqueous reaction mixture, without isolation and redispersal of the nanoparticles. In one particular embodiment, a soluble cerium salt is dissolved in water. To the cerium salt solution is added a quantity of ether carboxylic acid, the function of which is, in part, to stabilize the nanoparticle sol to be formed. A base is also added, altering the pH of the reaction mixture. An oxidant is added to the reaction mixture. The temperature of the reaction mixture is adjusted in the range of about 0° C. to about 100° C. and held at that temperature for a period of time. A stable cerium-containing sol is thereby directly formed without isolation of the cerium-containing nanoparticles. In particular embodiments, the cerium-containing nanoparticles are crystalline. In particular embodiments, the cerium-containing nanoparticles are crystalline cerium oxide characterized by a cubic fluorite structure. In a particular embodiment, the cerium-containing nanoparticles are characterized by the crystalline cerianite ($CeO_2$) structure.

In various embodiments the source of cerium ions, may include, for example, any source of cerous ($Ce^{3+}$) ion or ceric ($Ce^{4+}$) ion that is at least partially soluble in water. In specific embodiments, the source of cerous ion is cerous nitrate, cerous nitrate hexahydrate, cerous actate, cerous acetate hydrate, cerous acetylactonate hydrate, cerous chloride, cerous oxalate, cerous sulfate dehydrate, cerous sulfate hydrate or cerous sulfate octahydrate. In specific embodiments, the source of ceric ion is ceric sulfate, ceric sulfate hydrate or ceric nitrate, basic ($Ce(OH)(NO_3)_3 \cdot 3H_2O$).

In particular embodiments the source of hydroxide ion includes, but is not limited to, alkali metal hydroxides, such as sodium or potassium hydroxide, ammonium hydroxide, and water soluble amines.

In particular embodiments the ether carboxylic acid is a low molecular weight ether carboxylic acid given by formula (I):

$$R-O-(CH_2CH_2O)_n CHR^1 CO_2 Y \quad \text{(I)}$$

wherein:
R represents hydrogen or a substituted or unsubstituted alkyl group or a substituted or unsubstituted aromatic group;
$R^1$ represents hydrogen or an alkyl group;
Y represents H or a counterion; and
n is 0-5.

In specific embodiments, the nanoparticle stabilizer is a monoether carboxylic acid, such as, but not limited to, methoxyacetic acid, ethoxyacetic acid, 3-methoxypropionic acid, and combinations thereof.

In specific embodiments, the nanoparticle stabilizer is a polyether carboxylic acid, such as, but not limited to, 2-[2-(2-methoxyethoxy)ethoxy]acetic acid and 2-(2-methoxyethoxy)acetic acid.

In various embodiments, the ether carboxylic acid nanoparticle stabilizer is added to the reaction mixture, in whole or in part, prior to, along with or after the addition of the cerium and optional dopant metal ions. In various embodiments, the ether carboxylic acid is added, in whole or in part, prior to, during or after the formation of cerium-containing nanoparticles.

Oxidants for optional use in the invention include molecular oxygen, present, for example, in air. In other embodiments an oxidant more oxidizing than molecular oxygen may be employed. In various embodiments, an oxidant in the form of an alkali metal or ammonium perchlorate, chlorate, hypochlorite, or persulfate; ozone, a peroxide, such as hydrogen peroxide or tert-butyl hydroperoxide, or a combination of oxidants, is optionally employed.

In various embodiments, the amount of oxidant optionally employed varies widely in relation to the total amount of metal ions present. In particular embodiments the molar amount of oxidant present is equal to or greater than the total molar amount of metal ions. In specific embodiments, two-electron oxidants, such as hydrogen peroxide, are present in at least one-half the molar concentration of total oxidizable metal ions, such as cerous ion.

In a particular embodiment, the temperature of the reaction mixture is maintained at ambient temperature. In various embodiments, the temperature at which the reaction mixture is maintained ranges from 0° C. to about 100° C. In particular embodiments, the temperature of the reaction mixture is maintained at less than 90° C., at less than 85° C., or less than 80° C. In other embodiments, the reaction is conducted in a closed vessel at a temperature that equals or exceeds 100° C.

In embodiments employing elevated reaction temperatures, the duration of time at elevated temperature may vary widely, for example, from minutes to hours. In particular embodiments, a reaction temperature in the range of about 40° C. to about 85° C. is maintained for a time ranging from about 10 minutes to about 4 hours.

In particular embodiments, various mixing devices known in the art are employed to stir, mix, shear or agitate the contents of the reaction mixture. In particular embodiments, a colloid mill or a Silverson® High Shear Mixer is employed. In particular embodiments, one or more of the reactants is introduced below the surface of the aqueous reaction mixture. In a particular embodiment, a reactant is introduced below the surface of the aqueous reaction mixture in close proximity to a mixing device.

With the aim to eventually form powders of alkaline earth metal cerates in the perovskite phase, in particular embodiments, soluble salts of barium or strontium are then combined with the aqueous nanoceria sol. Generally, compounds exhibiting the perovskite structure, are characterized by the chemical formula, $ABO_3$. A is generally a divalent or trivalent cation. The smaller B-site cation is generally tetravalent or trivalent. The B-site is generally near the center of an oxygen octahedron. For barium cerate, for example, the divalent barium ion is at the A-site, and the tetravalent cerium ion is at the B-site. Alkaline earth metals are combined in substantially stoichiometric ratio with cerium (i.e. equimolar amount relative to cerium), so as to achieve the correct stoichiometry for the perovskite phase. It is known that barium loss at sintering temperatures can lead to lower proton conductivity in SOFCs, so that an excess of barium in the reaction mixture is desirable in some embodiments. Use of dopants as described herein below, introduces trivalent ions, mainly on the B-sites. Specific examples of the soluble alkaline earth metal salts include, but are not limited to, alkaline earth metal acetates, hydrated acetates, chlorides, chlorates, chlorites, formates, hydroxide-hydrates, iodides, lactates, nitrates and nitrites. The combined ceria sol and alkaline earth metal salt is then heated to form a first powder, which is a precursor to the alkaline earth metal cerate perovskite phase. Calcination of the first (precursor) powder results in the formation of a second powder. In particular embodiments, the second powder is a crystalline alkaline earth metal cerate material with a perovskite structure. In some embodiments, calcination temperatures are in the range of about 500° C. to about 1100° C., such as from about 650° C. to about 1100° C., and yield substantially single phase perovskite powders. In various embodiments the single phase content (i.e. phase purity) of the perovskite powders exceeds 75%, exceeds 80%, exceeds 85%, exceeds 90% and exceeds 95%. In other embodiments, the perovskite phase is present in amounts that exceed the minimum amount detectable by powder X-ray diffraction (i.e. about 4%). In some embodiments, wherein calcining temperatures are within or above the range described above, particle aggregation may result.

The term aggregation with respect to particles refers to collections of crystallites that are assembled into larger particles wherein strong chemical bonds, for example covalent or ionic bonds, connect the individual crystallites. Aggregates hinder the ability to form both green and sintered bodies at relatively high density. The presence of aggregates also reduces particle surface energies and leads to an increase in sintering temperature. Aggregates are difficult to break down into smaller constituents. To make aggregated powders suitable for sintering, repeated mechanical milling processes attempt to fracture aggregated particles to smaller particles.

The term agglomeration with respect to particles refers to collections of crystallites that are assembled into larger particles wherein relatively weak physical bonding, for example van der Waals forces, connect the individual crystallites. Such particles may be easily broken down in the process of cold pressing of green bodies or relatively mild mechanical milling processes, as is well-known in the ceramics art. A scanning electron micrograph of the inventive agglomerated calcined perovskite powder is shown in FIG. 1.

The term "doped" particle refers to a particle containing one or more foreign or dopant ions present in concentrations greater than would normally be present as impurities. In particular embodiments, the dopant includes yttrium ions or lanthanide ions. In this application, the term "lanthanide metal" is understood to encompass the 15 chemical elements of atomic number 57 to 71, which are included in Period 6 of the Periodic Table. Combinations of dopant metal ions are also considered. In various other embodiments, useful lanthanide dopants for the purposes of the invention include ions of ytterbium, gadolinium, neodymium, lanthanum, praseodymium, holmium, and samarium.

It is known that the normally trivalent yttrium and lanthanide dopants occupy the perovskite "B" site, substituting for Ce. The difference in valency causes charge-compensating oxygen vacancies to form and these are thought to lead to higher proton conductivities.

For the purposes of the invention, doping can be accomplished within the aqueous ceria sol. That is, the ceria nanoparticles within the stabilized aqueous dispersion may be doped by methods disclosed within the commonly assigned U.S. Patent Application Publication 2010/0242342 A1. Alternatively, dopants may be introduced via the addition of soluble dopant metal salts to the alkaline earth metal salt solution that is reacted with the ceria sol to ultimately form a doped perovskite phase.

In particular embodiments, dopant metal salt classes useful for the purposes of the invention include hydrated or anhydrous acetates, chlorides, bromides, bromates, formates, hydroxides, iodides and nitrates.

In various embodiments, dopant ions or combinations thereof are added in total molar amounts equal to or less than 50%, equal to or less than about 40%, less than about 30%, less than about 20%, less than about 10% and less than about 5%, relative to the total metals added.

While not wishing to be held to any particular theory, processes for forming the first (precursor) powder that are subsequently useful for sintering into dense bodies via calcination, include the heating to dryness of mixtures comprising solutions of alkaline earth metal salts and sols of crystalline cerium-containing nanoparticles, wherein the heating serves to drive off liquids, decompose reactants, and to react components. In particular embodiments, processes for forming such precursor powders include heating a mixture of an aqueous nanoceria sol and a soluble alkaline earth metal salt at temperatures ranging from about 100° C. to about 500° C. In a particular embodiment, an intermediate powder useful for calcination into barium cerate is formed by heating a mixture of a soluble barium salt and an aqueous nanoceria sol to dryness at about 450° C. Furthermore, in this particular embodiment, the heating yields a free-flowing whitish powder whose composition comprises ceria nanoparticles having size less than 5 nm (by XRD peak-width analysis) and $BaCO_3$. In this specific embodiment, calcining by further heating to about 900° C. for about 0.5-2 hours yields substantially single phase (perovskite) barium cerate, having crystallite size less than 40 nm by XRD peak-width analysis. In general, however, calcining the intermediate powders at temperatures in the range of about 650° C. to about 1100° C. may require for heating periods ranging from about 0.5 hour to about 16 hours in duration, Calcining may be done in air or oxygen, or mixtures thereof.

In a particular embodiment, a reaction by-product of the formation of the aqueous nanoceria sol, as described above, is ammonium nitrate. In certain embodiments, the aqueous nanoceria sol is washed by a process of diafiltration to remove the ammonium nitrate prior to the introduction of the soluble alkaline earth metal compounds to the reaction mixture. Heating the combined reaction mixture including optional dopants to dryness, yields first a precursor powder, and, after calcining at temperatures of about 900° C. for about 0.5 hour to about 2 hours, a substantially single phase perovskite powder having crystallite size of about 30 nm.

It is known that the incorporation of zirconium ion as a B-site substituent can yield an alkaline earth metal cerate-zirconate perovskite and can stabilize the alkaline earth cerate perovskite against chemical degradation for SOFCs operating in atmospheres containing $CO_2$ (e.g. air). At SOFC operating temperatures, formation of alkaline earth metal carbonates may occur, for example, with barium cerate. Therefore, in some embodiments, mixed aqueous sols of cerium oxide and zirconium oxide are used as a reactant in forming the alkaline earth metal cerate-zirconate oxide perovskite powder. The mixed aqueous sol is formed using an analogous process to the pure ceria sol already described herein, but wherein a source of zirconium ion is also added to the reactant mixture along with a base, an ether carboxylic acid stabilizer and an optional oxidant. Methods to produce mixed zirconium oxide-cerium oxide aqueous sols have been disclosed in copending U.S. Patent Application Publication 2010/0242342 A1, CERIUM-CONTAINING NANOPARTICLES, filed May 13, 2010.

In still other embodiments, the zirconium ion source can be introduced along with the soluble alkaline earth metal salt, when pure ceria sols are used as the nanoparticle reactant of the reactant mixture to form the first (precursor) powder.

Soluble zirconium compounds for the purposes of the invention include, for example, zirconyl nitrate hydrate, ammonium zirconium carbonate, zirconium acetoacetate, zirconium hydroxychloride, zirconium orthosulfate, and zirconium propionate.

EXAMPLES

Example 1

Aqueous Cerium Oxide Nanoparticle Dispersion (LMI-179)

To a 500 ml beaker, 50 g of cerium(III) nitrate hexahydrate was dissolved in 284 g distilled water, and 27.2 g of methoxyacetic acid was added while mixing with a magnetic bar in an air environment. The reaction mixture was held near room temperature (25° C.). Next 30.9 g of 14.5 M ammonium hydroxide was metered into the reaction mixture over a period of 1 minute. The pH of the reaction mixture reached a maximum of 8, and formed a milky white suspension. At that point 8.1 g of 50% hydrogen peroxide was added to the reaction mixture and the temperature was raised to 70° C. over 30 minutes and held at 70° C. for 1 hour. The turbidity was observed to disappear, and at this point a stable aqueous nanoparticle dispersion was formed. Dynamic Light Scattering analysis revealed an average particle size of 4.2 nm. As this number includes contributions from the solvation sphere, geometric nanoparticle size is expected to be smaller. XRD analysis of a dried sample indicated a major crystalline phase consistent with cerianite ($CeO_2$).

Example 2

Preparation of Barium Cerate Using Ceria Sol from Example 1

Figure 2:
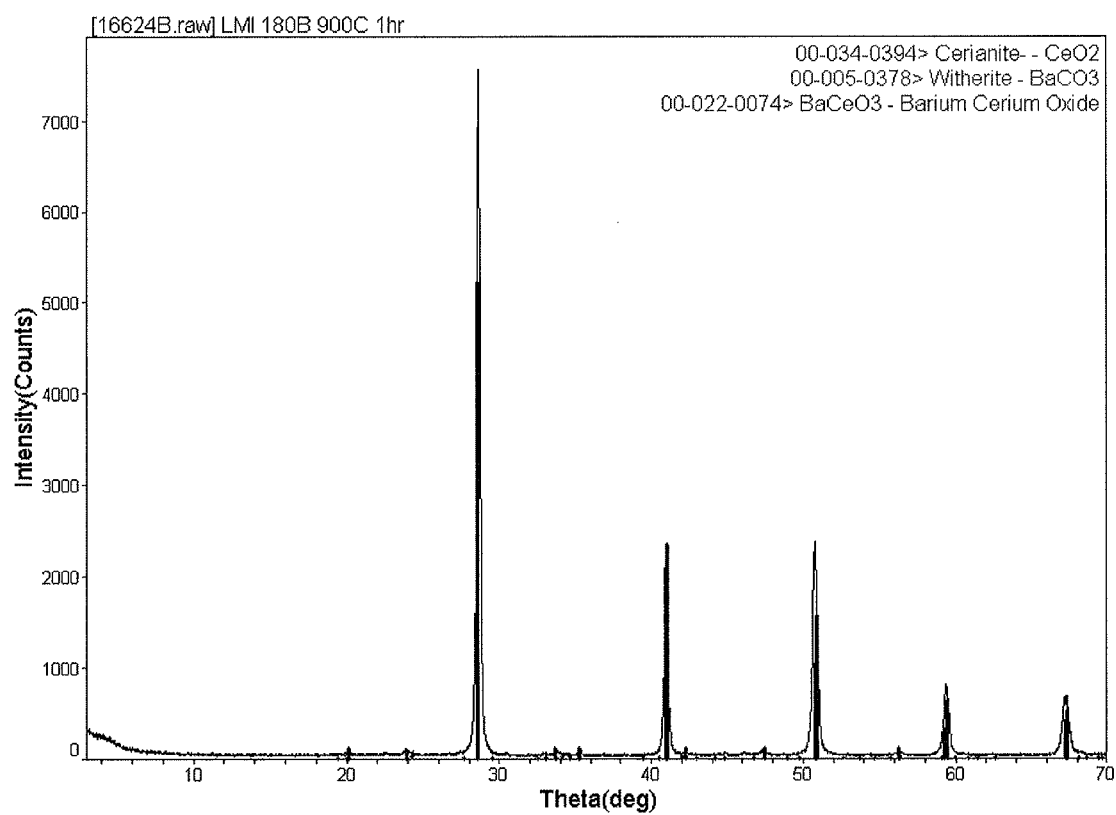
FIG. 2 is an X-ray diffraction spectrum for particles of the type depicted in FIG. 1, along with X-ray line spectra of cerianite ($CeO_2$) and witherite ($BaCO_3$).

A barium acetate solution was prepared by dissolving 2.935 g of barium acetate in 20 g of distilled water. This solution was then added to 37.35 g of the dispersion prepared in Example 1. The pH of this mixture was 6.1. The sample was heated on a hot plate in a 200 ml beaker until a powder was formed. A portion of the resulting powder was heated in a muffle furnace at 900° C. for one hour and cooled for subsequent XRD studies. XRD analysis gave the spectrum shown in FIG. 2 and confirmed major crystalline phases of $BaCeO_3$ and trace levels of $BaCO_3$ and $CeO_2$. The average crystallite size of 38.5 nm in the $BaCeO_3$ (200) direction was indicated using the Scherrer technique.

Example 3

Preparation of Barium Cerate Using Washed Ceria Sol

Figure 3:
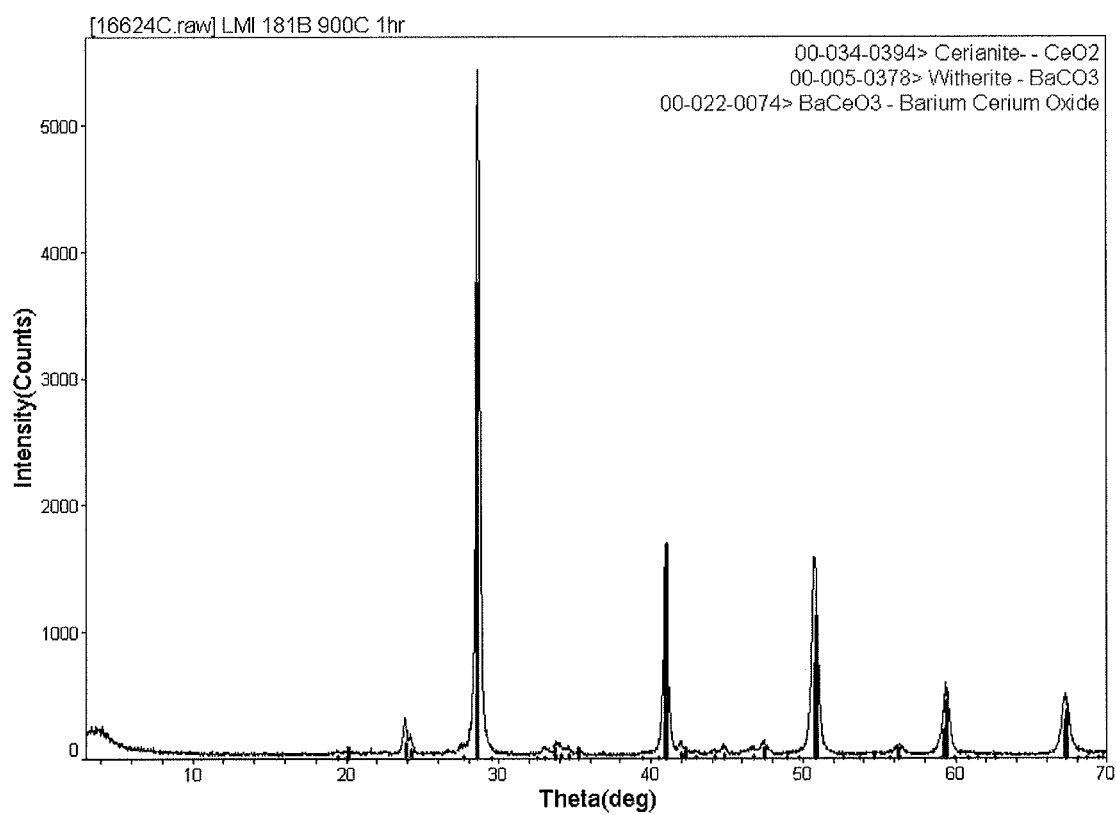
FIG. 3 is an X-ray diffraction spectrum for particles formed using a washed aqueous ceria sol as a reactant, as described in Example 3, along with X-ray line spectra of cerianite ($CeO_2$) and witherite ($BaCO_3$).

Residual ammonium nitrate was removed from a portion of the resulting dispersion from Example 1 by diafiltration, resulting in a $CeO_2$ nanoparticle dispersion with a solution ionic conductivity of 6.2 mS/cm and 1.12% solids. A barium acetate solution was prepared by dissolving 1.66 g of barium acetate in 10 g of distilled water. This solution was then added to 100 g of the washed $CeO_2$ nanoparticle dispersion. The pH of this mixture was 5.75. The mixture turned from yellow to darker brown-yellow when the barium acetate solution was added. The sample was heated on a hot plate in a 200 ml beaker until a yellow powder was formed. A portion of the resulting powder was heated in a muffle furnace at 900° C. for one hour and cooled for subsequent XRD studies. XRD analysis, shown in FIG. 3 confirmed major crystalline phases of $BaCeO_3$ and minor-trace levels of $BaCO_3$ and $CeO_2$. The average crystallite size of 30.5 nm in the $BaCeO_3$ (200) direction was indicated using the Scherrer technique.

Example 4

Preparation of Barium Zirconate-Cerate Using Ceria Sol

A barium acetate solution was prepared by dissolving 1.45 g of barium acetate in 10 g of distilled water. A second solution was prepared containing 0.171 g of zirconyl nitrate hydrate in 2 g of distilled water. These solutions were then added to 15 g of the dispersion prepared in Example 1. The sample was heated on a hot plate in a 200 ml beaker until a powder was formed. A portion of the resulting material was heated in a muffle furnace at 900° C. for one hour resulting in formation of a light yellow powder.

The invention has been described in detail, with particular reference to certain embodiments thereof, but it will be understood that variations and modifications can be effected within the spirit and scope of the invention as described above, by a person of ordinary skill in the art. Accordingly, it is intended that the invention not be limited to the described embodiments, but will have full scope defined by the claims.

What is claimed is:

1. A process, comprising:
  (a) combining an aqueous dispersion of cerium-containing nanoparticles with a substantially equimolar amount of a soluble alkaline earth metal material relative to cerium, thereby forming an aqueous reaction mixture;
  (b) heating said reaction mixture to dryness, thereby forming a powder comprising cerium-containing nanoparticles and alkaline earth metal-containing particles.

2. The process according to claim 1, wherein said alkaline earth metal material comprises an alkaline earth metal selected from the group consisting of barium and strontium.

3. The process according to claim 1, wherein said cerium-containing nanoparticles have a particle size in the range of 1 to 50 nm.

4. The process according to claim 1, wherein said cerium-containing nanoparticles are crystalline.

5. The process according to claim 4, wherein said cerium-containing nanoparticles have a cubic fluorite crystal structure.

6. The process according to claim 1, wherein said cerium-containing nanoparticles comprise one or more dopants selected from the group consisting of zirconium, yttrium, ytterbium, gadolinium, europium, and combinations thereof.

7. The process according to claim 1, wherein said aqueous reaction mixture further comprises a source of zirconium ions.

8. The process according to claim 1, wherein said aqueous dispersion of cerium-containing nanoparticles is formed from an aqueous reaction mixture comprising a source of cerium ions, a nanoparticle stabilizer, a source of hydroxide ions, and an oxidant, and adjusting the temperature of the reaction mixture into the range of about 0° C. to about 100° C., thereby forming the aqueous dispersion of cerium-containing nanoparticles.

9. The process according to claim 8, wherein said nanoparticle stabilizer comprises an ether carboxylic acid of formula I,

$$R-O-(CH_2CH_2O)_nCHR^1CO_2Y \qquad (I)$$

wherein:
  R represents hydrogen or a substituted or unsubstituted alkyl group or a substituted or unsubstituted aromatic group;
  $R^1$ represents hydrogen or an alkyl group;
  Y represents H or a counterion; and
  n is 0-5.

10. The process according to claim 8, wherein the nanoparticle stabilizer is a carboxylic acid selected from the group consisting of methoxy acetic acid, 2-[2-(2-methoxyethoxy)ethoxy]acetic acid and 2-(2-methoxyethoxy)acetic acid.

11. The process according to claim 8, wherein the oxidant is selected from the group consisting of alkali metal perchlorate, alkali metal chlorate, alkali metal hypochlorite, alkali metal persulfate, ammonium perchlorate, ammonium chlorate, ammonium hypochlorite, ammonium persulfate, ozone, and hydrogen peroxide.

12. The process according to claim 1, further comprising a step of calcining said powder to form a second powder comprising an alkaline earth metal cerate.

13. The process according to claim 12, wherein said alkaline earth metal cerate is characterized by a perovskite crystal structure.

14. The process according to claim 12, wherein said step of calcining includes heating to a temperature in the range of about 500° C. and about 1100° C.

15. An alkaline earth metal cerate powder prepared according to the process of claim 12, wherein the second powder has a grain size of less than 40 nm and the alkaline earth metal cerate comprises one or more dopants selected from the group consisting of zirconium, ytterbium, gadolinium, europium, and combinations thereof, and comprises no other dopants.

16. An alkaline earth metal cerate powder of claim 15, wherein said alkaline earth metal is barium.

17. An alkaline earth metal cerate powder characterized by a perovskite structure and a grain size of less than 40 nm, wherein the alkaline earth metal cerate comprises one or more dopants selected from the group consisting of zirconium, ytterbium, gadolinium, europium, and combinations thereof, and comprises no other dopants.

18. An alkaline earth metal cerate powder of claim 17, wherein said alkaline earth metal is barium.

19. A process, comprising:
  (a) combining an aqueous dispersion of cerium-containing nanoparticles with a substantially equimolar amount of a soluble alkaline earth metal material relative to cerium, thereby forming an aqueous reaction mixture;
  (b) heating said reaction mixture to dryness, thereby forming a first powder; and
  (c) calcining the first powder to form a second powder comprising an alkaline earth metal cerate.

20. The process according to claim 19, wherein said step of calcining includes heating to a temperature in the range of about 500° C. and about 1100° C.

* * * * *